(12) United States Patent
McNamara

(10) Patent No.: US 6,307,670 B1
(45) Date of Patent: Oct. 23, 2001

(54) PUMP POWER CONTROL FOR OPTICAL FIBER AMPLIFIER

(75) Inventor: Thomas W. McNamara, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/461,678

(22) Filed: Dec. 14, 1999

(51) Int. Cl.$^7$ .................................................. H01S 3/00
(52) U.S. Cl. .................. 359/341.33; 359/341.41
(58) Field of Search .................. 359/341, 124, 359/341.33, 341.41

(56) References Cited

U.S. PATENT DOCUMENTS

| | | | |
|---|---|---|---|
| 5,117,196 | 5/1992 | Epworth et al. | 359/333 |
| 5,245,690 | 9/1993 | Aida et al. | 385/142 |
| 5,506,724 | 4/1996 | Shimizu et al. | 359/341 |
| 5,563,732 | 10/1996 | Erdogan et al. | 359/341 |
| 5,706,124 | 1/1998 | Imoto et al. | 359/341 |
| 5,710,660 | 1/1998 | Yamamoto et al. | 359/341 |
| 5,812,710 | 9/1998 | Sugaya | 385/27 |
| 5,835,259 | 11/1998 | Kakui et al. | 359/341 |
| 5,900,968 | 5/1999 | Srivastava et al. | 359/341 |
| 5,903,385 | 5/1999 | Sugaya et al. | 359/341 |
| 5,907,429 | 5/1999 | Sugata | 359/341 |
| 5,912,761 | 6/1999 | Jander et al. | 359/341 |
| 5,923,463 * | 7/1999 | Hamada | 359/341 |
| 6,094,298 | 7/2000 | Luo et al. | 359/346 |

FOREIGN PATENT DOCUMENTS 0871302 10/1998 (EP).
2334397 8/1999 (GB).

OTHER PUBLICATIONS

"Accurate Control of Output Power Level in Gain–Flattened EDFA with Low Noise Figure," S. Y. Park et al., ECOC 97—Eleventh International Conference on Integrated Optics and Optical Fibre Communications 23rd European Conference on Optical Communications IOOC–ECOC 97 (Conf. Publ. No. 448), Sep. 22–25, 1997, pp. 43–46.

* cited by examiner

Primary Examiner—Mark Hellner
(74) Attorney, Agent, or Firm—Price, Heneveld, Cooper, DeWitt & Litton

(57) ABSTRACT

A gain-controllable optical fiber amplifier having an input for receiving an optical signal and an output for providing an amplified optical signal. A first gain stage is coupled between the input and output and includes a first optical fiber and a first pump. A second gain stage is coupled in series with the first stage and includes a second optical fiber and a second pump. The amplifier includes a pump controller for controlling the first and second pumps and adjusting the power output of the first and second pumps to maintain a substantially constant gain. The controller decreases the power output from each of the first and second pumps as a function of minimum output of each pump to minimize noise. Accordingly, the present invention advantageously controls the gain applied to an optical fiber in a manner that minimizes the amount of noise that may otherwise be introduced into the optical signal, especially when the input power is comparable to the backward amplified spontaneous emission of the amplifier.

29 Claims, 3 Drawing Sheets

PUMP POWER CONTROL FOR OPTICAL FIBER AMPLIFIER

BACKGROUND OF THE INVENTION

1. Field of the Invention

The present invention relates to an optical amplifier having an optical fiber and, more particularly, to a gain-controllable optical fiber amplifier and method of controlling the amplifier pump power.

2. Technical Background

Data communication systems increasingly are employing optical fibers as the transmission paths for information. The use of optical fiber generally allows for the transmission of large amounts of data at high speeds for long distance transmission. Optical fiber, although to a lesser extent than other transmission mediums such as wire, usually is susceptible to some signal loss such that signals transmitted therewith are attenuated as the transmission path becomes longer. As a consequence, one or more optical amplifiers are often employed in the communication path to amplify the optical signals.

Various types of optical amplifiers have been developed and are used to amplify optical signals. In particular, the erbium-doped fiber amplifier (EDFA) is one example of an optical fiber amplifier that is widely known for use in amplifying optical signals. The erbium-doped fiber amplifier is a rare earth element-doped optical fiber amplifier containing erbium, as the rare earth substance, injected into the optical fiber and raised to an excited state by pump light that is input separately from the signal light so that the signal light is amplified by the pump energy. Accordingly, the amplifier generally requires one or more pump light sources coupled to the optical fiber.

In recent years, the amount of information transmitted on optical fibers has increased significantly. Typically, to increase the capacity of the optical transmission path, several light signals at different wavelengths (i.e., channels) are multiplexed for transmission through a single optical transmission. In a multiple-wavelength multiplexed transmission system, a plurality of channels are made available for transmission by an optical fiber. However, the total number of active channels that are used may fluctuate as channels are added or dropped depending on the demand, or in the event that channels fail. In order to maintain a constant per-channel gain, the gain of a fiber amplifier used in the systems generally must be controlled in response to changes in the number of active channels. Accordingly, the greater the number of channels that are multiplexed on an optical fiber, generally the greater the amount of pump energy that becomes necessary to maintain a constant per-channel gain, and vice versa.

While the source of pump light may be controlled in conventional optical amplifiers to provide a substantially constant overall gain, a number of drawbacks exist. Conventional constant gain amplifiers do not completely compensate for changes in the number of channels. In conventional amplifiers, changes in the number of channels generally leads to noise figure degradation and per channel power variations. In particular, multiple-pump rare earth element-doped fiber amplifiers commonly have an internal element, such as a dispersion compensation filter, that is generally sensitive to high per-channel signal powers. Gain or power control achieved by varying the pump power of the rare earth element-doped fiber may present noise figure degradation, especially when the total input power becomes comparable to backward amplified spontaneous emission (ASE) at the input of the amplifier coil. For this reason and others, it is desirable to provide a gain controllable fiber amplifier that minimizes the amount of noise introduced by the amplifier.

SUMMARY OF THE INVENTION

The present invention provides a gain-controllable optical fiber amplifier and method of controlling gain that minimizes noise introduced into the optical signal and minimizes excursions in the per channel power internal to the amplifier. To achieve this and other advantages, and in accordance with the purpose of the present invention as embodied and described herein, the present invention provides a gain-controllable optical fiber amplifier having an input for receiving an optical signal and an output for providing an amplified optical signal. A first gain stage is coupled between the input and output and includes a first optical fiber and a first pump. According to a further aspect of the present invention, a second gain stage is coupled in series with the first gain stage and includes a second optical fiber and a second pump. The amplifier includes a pump controller for controlling the amount of power output from each of the pumps to maintain a substantially constant overall gain. The controller decreases the power output from each of the pumps as a function of a minimum value of the corresponding pump to minimize the noise level sufficient to support amplified spontaneous emission. Accordingly, the present invention advantageously controls the gain applied in an optical fiber amplifier in a manner that minimizes the amount of noise that may otherwise be introduced into the optical signal.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention.

DETAILED DESCRIPTION OF THE PREFERRED EMBODIMENT

Figure 1:
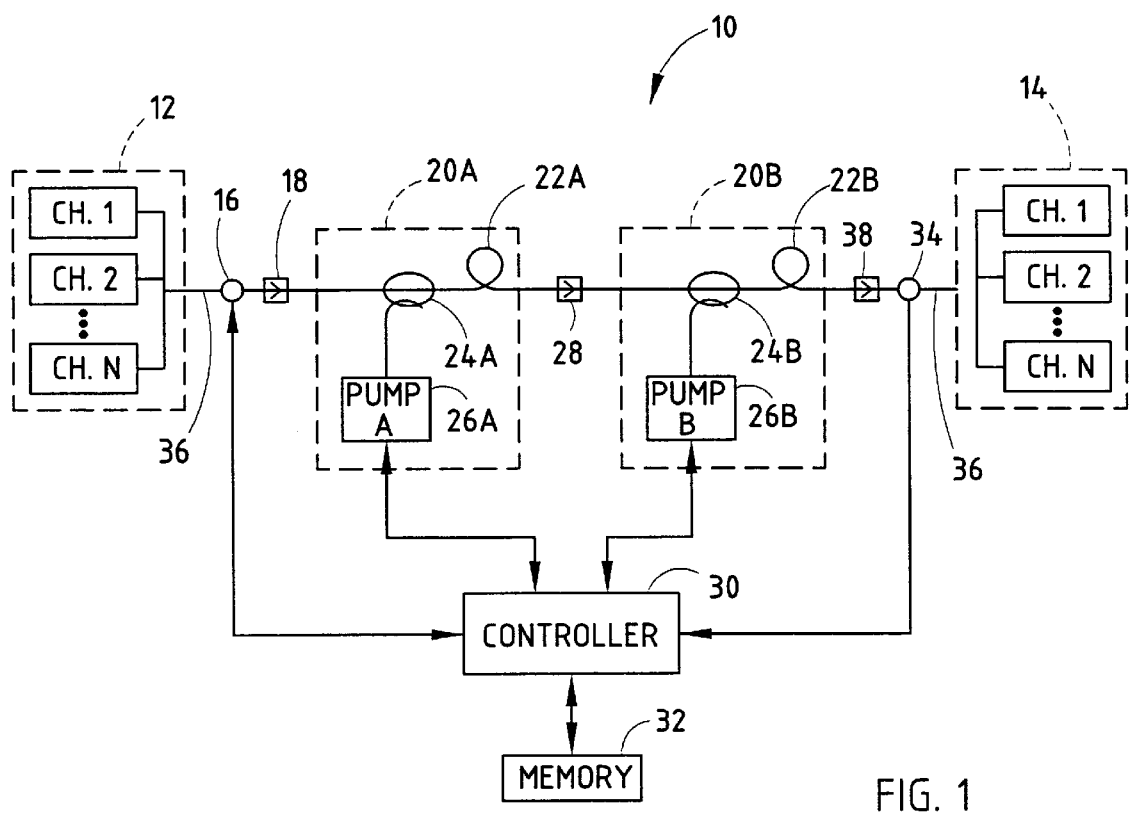
FIG. 1 is a schematic and block diagram illustrating the configuration of a gain-controllable multiple-pump fiber amplifier and control system according to the present invention.

Referring to FIG. 1, a multiple-pump fiber amplifier 10 is coupled between a sending station 12 and a receiving station 14 for amplifying optical signals transmitted therebetween on an optical fiber 36. Sending station 12 generally includes a plurality of signal channels, such as CH. 1 through CH. N, which are unique frequencies wavelength division multiplexed and transmitted onto a single optical fiber. As a result, a plurality of light signals at different wavelengths are multiplexed for transmission through the optical fiber 36 and the fiber amplifier 10 to a receiving station 14. Receiving station 14 provides wavelength division demultiplexing that divides the amplified signals received from the fiber amplifier 10 and optical fiber 36 into each of the corresponding channels CH. 1 through CH. N. The multiple-pump fiber amplifier 10 of the present invention amplifies the optical signal transmission and controls the amplification gain to maintain a substantially constant per-channel gain with minimal noise as described herein.

The fiber amplifier 10 includes an input 16 for receiving the transmitted wavelength division multiplexed optical signals on optical fiber 36, and an output 34 for providing the amplified optical signals to the receiving station 14 via optical fiber 36. The fiber amplifier 10 has a first gain stage 20A and a second gain stage 20B coupled in series between the input 16 and the output 18. A first optical isolator 18 is coupled between the input 16 and the first gain stage 20A, while a second optical isolator 28 is coupled between the first and second gain stages 20A and 20B. A third optical isolator 38 is coupled between the second gain stage 20B and output 34. Optical isolators 18, 28, and 38 are employed to prevent the doped fibers from entering unstable conditions, e.g., oscillation, due to reflections on either the input or output sides of the amplifier gain stages 20A and 20B.

The first gain stage 20A includes an erbium-doped optical fiber 22A, and a variable light pump 26A shown as pump A. A coupler 24A couples the light output of pump 26A to the optical fiber 22A to amplify the intensity of the optical signals at input 16. Accordingly, pump 26A provides a light source to optical fiber 22A via coupler 24A in an amount that is controlled as explained herein to amplify the optical signals. Pump 26A conventionally includes a driver (not shown) which receives a control signal from controller 30 to control the drive current, and therefore the pump power.

The second gain stage 20B likewise includes an erbium-doped optical fiber 22B, and a variable light pump 26B shown as PUMP B. A coupler 24B couples the light output of pump 26B to the optical fiber 22B to amplify the intensity of the optical signals. Accordingly, pump 26B provides a light source to the optical fiber 22B via coupler 24B in an amount that is controlled as explained herein to further amplify the optical signals. Pump 26B likewise includes a conventional driver (not shown) which receives a control signal from controller 30 to control the drive current, and therefore the pump power. The light pumps 26A and 26B each are variable power band pumps operable at wavelengths of 1480 nm and/or 980 nm.

The multiple-pump fiber amplifier 10 of the present invention preferably includes rare earth element-doped optical fibers 22A and 22B preferably employing erbium as the rare earth element. Amplifier 10 therefore generally has an internal element, such as a dispersion compensating fiber, which can be sensitive to high per channel signal powers, especially when varying the pump power to the erbium-doped fiber for gain control. The present invention advantageously controls the light pump power to minimize noise introduction into the optical fiber, which otherwise may suffer from noise figure degradation caused at least in part by the internal element and decrease in any power thereto.

Controller 30 includes a conventional commercially available microprocessor that generates pump control output signals to control both light pumps 26A and 26B. In addition, a non-volatile memory 32 is provided for storing program routines for measuring and storing various pump power control setpoint values, as well as other information, and a pump control routine for controlling pump power according to the present invention. While the preferred embodiment employs a microprocessor-based controller 30 and memory 32, it should be appreciated that the pump control of the present invention could likewise be implemented in other programmable circuits without departing from the teachings of the present invention.

The present invention controls the pump power distribution in fiber amplifier 10 to provide substantially constant per channel output gain control, while minimizing the introduction of noise into the optical signals. The pump power controller 30 preferably controls a plurality of optical pumps to vary the pump power of individual pumps as needed when one or more signal channels are added or dropped from the load by adjusting the pump power sufficiently to hold the per-channel power output substantially constant. The light pumps 26A and 26B are controlled such that pump power does not drop below a minimum value to avoid noise figure degradation when the total input power becomes small enough to be comparable to the backward amplified spontaneous emission (ASE) present at the input of the amplifier. While two light pumps 26A and 26B are shown and described herein, it should be appreciate that the pump control of the present invention may include two or more light pumps, and further may be applicable to single light pump control.

Figure 2:
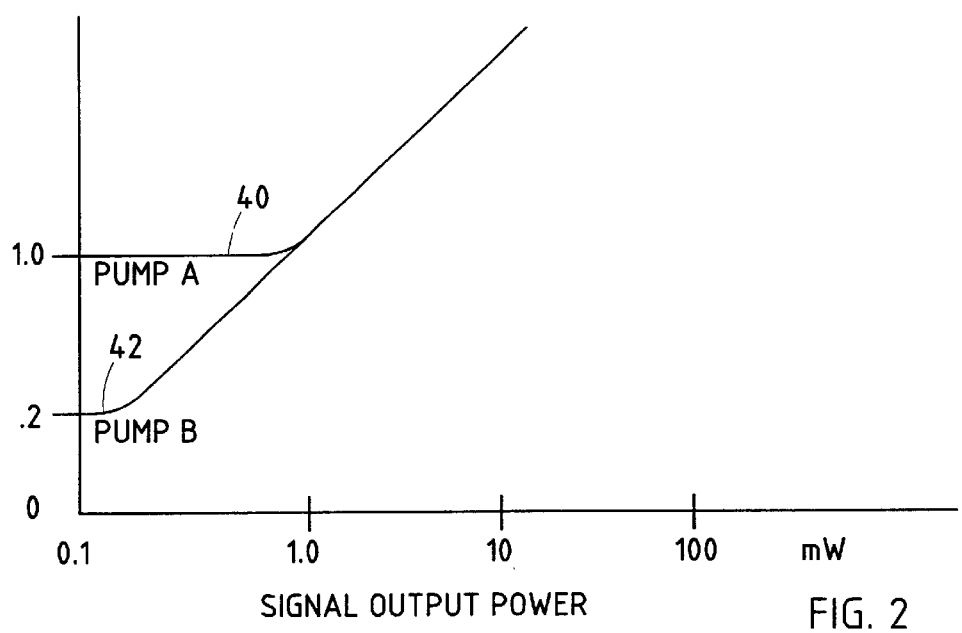
FIG. 2 is a graph illustrating pump operating curves with minimum pump power values for controlling two light pumps.

Referring to FIG. 2, the graph shown illustrates the logarithmic pump power operating curves with minimum pump power requirements for each of light pumps 26A and 26B, as shown by curves 40 and 42, respectively. The output power curves 40 and 42 provide minimum pump power values for each of the corresponding pumps to prevent noise figure degradation when the total input power becomes comparable to the backward amplified spontaneous emission that is present at the input to the corresponding amplifier stage. The output power curves 40 and 42 for each of respective light pumps 26A and 26B represents the pump power output as shown. Alternatively, pump power drive current may be used to maintain the total signal output power level as shown. The output power curves may be empirically determined, as explained herein, or may be calculated. Pump 26A has a pump output curve 40 that levels off to a minimum acceptable pump power of approximately 1.0 milliwatts for a signal output power of approximately 1.0 milliwatts or less. PUMP 26B, on the other hand, has a pump power output curve 42 that levels off at a minimum pump power of approximately 0.2 milliwatts for a signal output power of approximately 0.2 milliwatts or less. Thus, below 1.0 milliwatt of signal output power only the gain of pump 26B can be adjusted and its lower limit is 0.2 milliwatts. The graph shown and described herein illustrates one example of the minimum pump power that may be used for two given pumps to determine a minimum value below which the individual pumps can no longer be controlled to avoid the introduction of unwanted noise into the optical signal.

Accordingly, when the total signal output power is above 1.0 milliwatt, pump 26A and pump 26B are preferably controlled in proportion to one another to increase and decrease the signal amplification as needed to maintain a substantially constant perchannel signal output. However, when the pump power or drive current drops below the minimum value for the corresponding pump, such as a value of 1.0 milliwatt for pump 26A or a value of 0.2 milliwatt for pump 26B, the corresponding light pump is held at the minimum pump power and is thereby prevented from being further reduced to avoid introducing noise into the optical signal. When the total signal output power increases above the minimum values of 0.2 and 1.0 milliwatts as shown by curves 40 and 42, the corresponding pumps may once again be increased in power as required as shown by the coincident power curves 40 and 42 above about 1.0 milliwatt.

Figure 3:
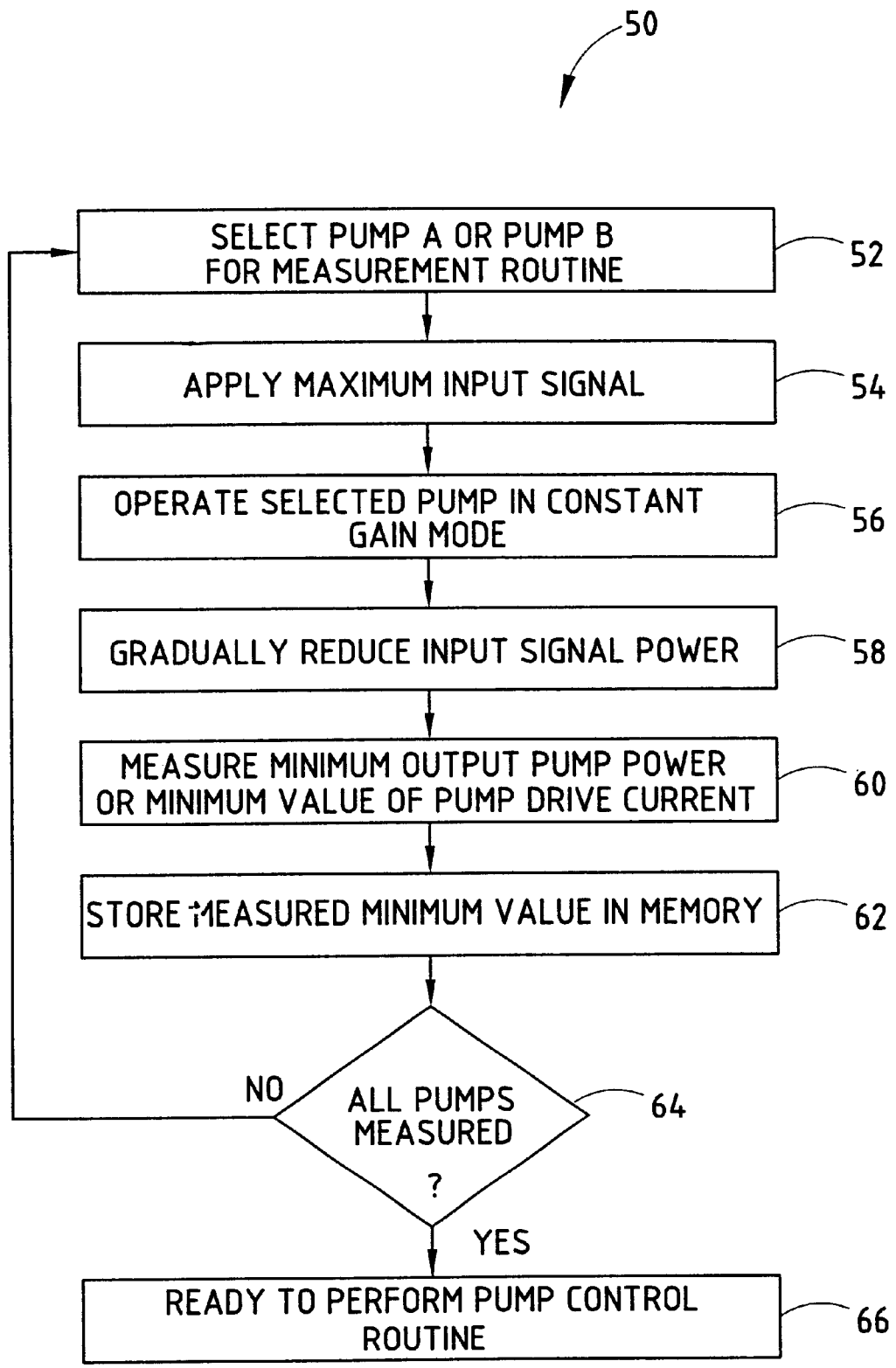
FIG. 3 is a flow diagram illustrating the method for measuring minimum pump power values for each of the light pumps.

FIG. 3 illustrates a method 50 of measuring the minimum allowable output pump power or drive current for each light pump. Method 50 includes step 52 of selecting one at a time either pump 26A or pump 26B for the measurement routine. The power of the pumps is measured by using a light detecting photo diode or other conventional measurement device suitably coupled to the pump output. Once the light pump to be measured is selected, the remaining light pumps and corresponding gain stages are removed from the transmission path to have no effect on the optical signals, and a maximum input signal is applied to the amplifier as provided in step 54. With the maximum input signal applied, the selected light pump is operated in a constant gain mode in step 56. The constant gain mode provides that the light pump is controlled to maintain a substantially constant output signal at output 34, while the input signal power is gradually reduced in step 58. As the input signal power is reduced, either the minimum pump power output or the minimum pump drive current for the selected pump is measured to determine the minimum value in step 60. For pump 26A the minimum valve is about 1.0 milliwatt as shown by curve 40 in FIG. 2. The minimum value as determined in step 60 is then stored in memory in step 62.

Once the minimum value for the selected light pump is measured and stored in memory, decision block 64 checks to see if the all of the light pumps have been measured and, if not, returns to step 52 to repeat the measuring of the minimum pump value for each of the remaining pumps, one at a time. Once all the light pumps have been determined for the minimum values, method 50 proceeds to step 66 to a ready condition where the amplifier is ready to control the amplification according to the pump control routine.

Figure 4:
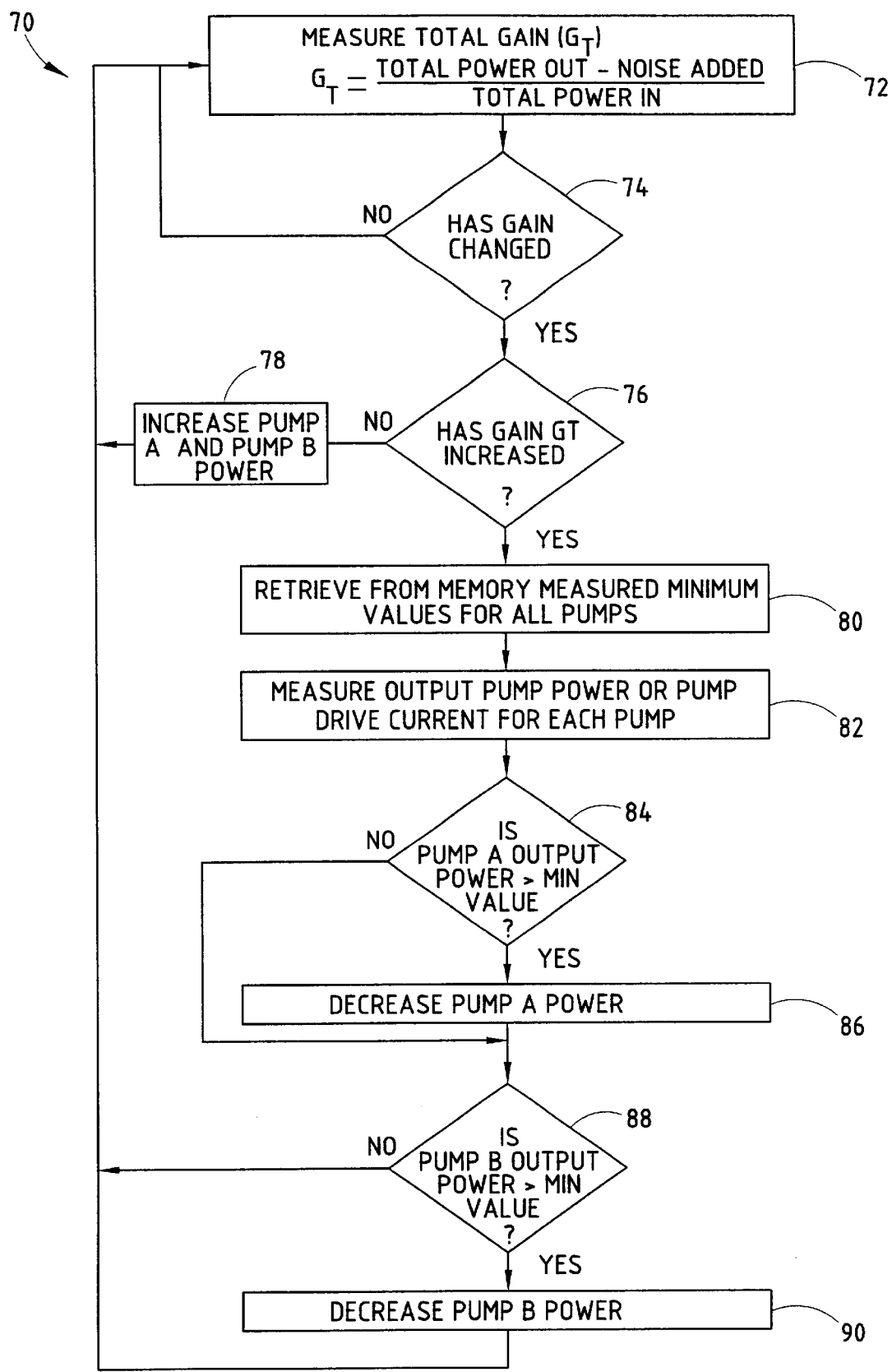
FIG. 4 is a flow diagram illustrating a method for controlling the pump power in accordance with the present invention.

The pump control method 70 of FIG. 4 includes step 72 of measuring the total amplifier gain $G_T$. The total gain $G_T$ is preferably measured by measuring the total output power at output 34 reduced by any noise added by the amplifier and divided by the total input power measured at input 16. The output and input power may be measured using conventional measuring devices. Proceeding to decision block 74, pump control method 70 checks whether the gain $G_T$ has changed from the last measured gain value and, if not, returns to step 72. If the gain $G_T$ has changed, by for example, the addition or deletion of a channel decision block 76 checks whether the gain has increased. If the gain has not increased, it has decreased and the power of pump 26A and pump 26B are proportionately increased incrementally by a selected amount, and thereafter method 70 returns to step 72. If the gain has increased, method 70 proceeds to step 80 to retrieve the measured minimum values from memory for each of the light pumps.

In step 82, either the pump output power or pump drive current for each pump is measured. Decision step 84 compares the measured output pump power or pump drive current for each light pump with the pump's corresponding minimum value and determines if the pump output power or drive current is greater than the minimum value. If the output power or drive current for pump 26A is greater than the minimum value, method 70 proceeds to decrease the power of pump 26A by a select incremental amount in step 86. Decision step 88 checks whether the output power or drive current of pump 26B is greater than the minimum value for pump 26B. If the output power or drive current of pump 26B is greater than the minimum value, step 90 likewise decreases the power of pump 26B by a select incremental amount. When both pumps 26A and 26B are operating above the minimum values, it is preferred that they are increased and decreased in proportion to one another to achieve the substantially constant per-channel gain.

Accordingly, pumps 26A and 26B are decreased in output power only if the pump output power or pump drive current is greater than the minimum value stored in memory for the corresponding pump. Pumps 26A and 26B are therefore limited to above a minimum pump power output to prevent or minimize the amount of noise that may otherwise be injected into the optical signal, especially when the input power becomes comparable to the backward amplified spontaneous emission of the amplifier coils.

It will become apparent to those skilled in the art that various modifications to the preferred embodiment of the invention as described herein can be made without departing from the spirit or scope of the invention as defined by the appended claims.

The invention claimed is:

1. A gain-controllable multiple-pump fiber amplifier comprising:
    an input for receiving optical signals;
    an output for providing amplified optical signals;
    a first gain stage coupled between the input and the output and including a first optical fiber and a first pump;
    a second gain stage coupled between the input and the output and including a second optical fiber and a second pump; and
    a pump controller coupled to said first and second gain stages for adjusting the power output from the first and the second pumps to maintain a substantially constant gain, wherein the controller limits the lower power output from each of the first and the second pumps to above a minimum value to minimize noise, wherein the minimum value comprises a substantially minimum value for the corresponding pump to support backward amplified spontaneous emission.

2. The amplifier as defined in claim 1, wherein the minimum value comprises a minimum pump output power.

3. The amplifier as defined in claim 1, wherein the minimum value comprises a minimum pump drive current.

4. The amplifier as defined in claim 1, wherein the minimum value is determined by applying a high input signal to one of the first and second pumps while operating in a constant gain mode, and gradually reducing the input signal until amplified spontaneous emissions at a predetermined level are detected to determine the minimum value of the one pump.

5. The amplifier as defined in claim 1, wherein the first and second optical fibers comprise erbium-doped fiber.

6. A gain-controllable multiple-pump fiber amplifier comprising:
    an input for receiving optical signals;
    an output for providing amplified optical signals;
    a first gain stage coupled between the input and the output and including a first optical fiber and a first pump;
    a second gain stage coupled between the input and the output and including a second optical fiber and a second pump; and a pump controller coupled to said first and second gain stages for adjusting the power output from the first and the second pumps to maintain a substantially constant gain, wherein the controller limits the lower power output from each of the first and the second pumps to above a minimum value to minimize noise, wherein the controller further computes a total gain of the amplifier as a function of total power output and total power input.

7. A gain-controllable multiple-pump fiber amplifier comprising:

an input for receiving optical signals;

an output for providing amplified optical signals;

a first gain stage coupled between the input and the output and including a first optical fiber and a first pump;

a second gain stage coupled between the input and the output and including a second optical fiber and a second pump; and a pump controller coupled to said first and second gain stages for adjusting the power output from the first and the second pumps to maintain a substantially constant gain, wherein the controller limits the lower power output from each of the first and the second pumps to above a minimum value to minimize noise, wherein the optical signals comprise a plurality of signal channels that may change in number, said controller controlling the first and second pumps to maintain a substantially constant gain per channel.

8. A gain-controllable fiber amplifier comprising:

an input for receiving optical signals;

an output for providing amplified optical signals;

a first gain stage coupled between the input and the output and including a first optical fiber and a first pump; and a pump controller for controlling the first pump and adjusting the power output from the first pump to maintain a substantially constant gain, wherein the controller decreases the power output from the first pump as a function of a minimum value to minimize noise, wherein the minimum value comprises a substantially minimum value output for the first pump to support backward amplified spontaneous emission.

9. The amplifier as defined in claim 8, wherein the minimum value comprises a minimum pump output power.

10. The amplifier as defined in claim 8, wherein the minimum value comprises a minimum pump drive current.

11. The amplifier as defined in claim 8, wherein the minimum value is determined by applying a high input signal to the first pump while operating in a constant gain mode, and gradually reducing input signal power to a low input signal until amplified spontaneous emissions at a predetermined level are detected to determine the minimum value of the first pump.

12. The amplifier as defined in claim 8, wherein the first optical fiber comprises an erbium-doped fiber.

13. The amplifier as defined in claim 8 further comprising a second gain stage coupled in series with the first gain stage and including a second optical fiber and a second pump, wherein the controller further controls the second pump and adjusts the power output of the second pump to maintain a substantially constant gain, wherein the controller further decreases the power output from the second pump as a function of minimum output of the second pump to minimize noise.

14. A method of controlling gain in a multiple-pump fiber amplifier, said method comprising the steps of:

receiving optical signals;

amplifying the optical signals in a first gain stage including a first optical fiber and a first pump;

amplifying the optical signal in a second gain stage including a second optical fiber and a second pump;

controlling the amount of power output by the first and second pumps to maintain a substantially constant gain by adjusting the power output of the first and second pumps;

measuring and storing a minimum value for the first and second pumps to support backward amplified spontaneous emission;

decreasing the power output from the first pump as a function of the minimum value of the first pump to minimize noise;

decreasing the power output from the second pump as a function of the minimum value of the second pump to minimize noise; and providing an amplified output signal.

15. The method as defined in claim 14, wherein the step of determining the minimum value includes determining a minimum pump output power.

16. The method as defined in claim 14, wherein the step of determining the minimum value includes determining a minimum value of pump drive current.

17. The method as defined in claim 14 further comprising the steps of:

applying a high input signal to one of the first and second pumps while operating in a constant gain mode, and gradually reducing input signal power to a low input signal until amplified spontaneous emissions at a predetermined level are detected to determine the minimum value of the one pump.

18. A method of controlling gain in a multiple-pump fiber amplifier, said method comprising the steps of:

receiving optical signals;

amplifying the optical signals in a first gain stage including a first optical fiber and a first pump;

amplifying the optical signal in a second gain stage including a second optical fiber and a second pump;

controlling the amount of power output by the first and second pumps to maintain a substantially constant gain by adjusting the power output of the first and second pumps;

computing a total gain of the amplifier as a function of total power output and total power input;

decreasing the power output from the first pump as a function of a minimum value of the first pump to minimize noise;

decreasing the power output from the second pump as a function of a minimum value of the second pump to minimize noise; and providing an amplified output signal.

19. A method of controlling gain in a multiple-pump fiber amplifier, said method comprising the steps of:

receiving optical signals;

amplifying the optical signals in a first gain stage including a first optical fiber and a first pump;

amplifying the optical signal in a second gain stage including a second optical fiber and a second pump;

adjusting gain of the amplifier as a function of the number of selected signal channels on the received optical signal to maintain a substantially constant gain per channel;

controlling the amount of power output by the first and second pumps to maintain a substantially constant gain by adjusting the power output of the first and second pumps;

decreasing the power output from the first pump as a function of a minimum value of the first pump to minimize noise;

decreasing the power output from the second pump as a function of a minimum value of the second pump to minimize noise; and providing an amplified output signal.

20. A method of controlling gain in a fiber amplifier, said method comprising the steps of:

receiving optical signals;

amplifying the optical signals in a first gain stage including a first optical fiber and a first pump;

controlling the amount of power output by the first pump to maintain a substantially constant gain by adjusting the power output of the first pump;

determining a minimum value for the first pump to support backward amplified spontaneous emission;

decreasing the power output from the first pump as a function of the minimum value to minimize noise; and providing an amplified output signal.

21. The method as defined in claim 20, wherein the step of determining the minimum value includes determining a minimum pump output power.

22. The method as defined in claim 20, wherein the step of determining the minimum value includes determining a minimum value of pump drive current.

23. The method as defined in claim 20 further comprising the steps of:

applying a high input value to the first pump while operating in a constant gain mode, and gradually reducing input signal power to a low input signal until amplified spontaneous emissions at a predetermined level are detected to determine the minimum value of the first pump.

24. A method of controlling gain in a fiber amplifier, said method comprising the steps of:

receiving optical signals;

amplifying the optical signals in a first gain stage including a first optical fiber and a first pump;

controlling the amount of power output by the first pump to maintain a substantially constant gain by adjusting the power output of the first pump;

computing a total gain of the amplifier as a function of total power output and total power input;

decreasing the power output from the first pump as a function of a minimum value to minimize noise; and providing an amplified output signal.

25. A method of controlling gain in a fiber amplifier, said method comprising the steps of:

receiving optical signals;

amplifying the optical signals in a first gain stage including a first optical fiber and a first pump;

adjusting gain of the amplifier as a function of the number of selected signal channels on the received optical signal to maintain a substantially constant gain per channel;

controlling the amount of power output by the first pump to maintain a substantially constant gain by adjusting the power output of the first pump;

decreasing the power output from the first pump as a function of a minimum value to minimize noise; and providing an amplified output signal.

26. The method as defined in claim 20 further comprising the steps of:

amplifying the optical signal in a second gain stage including a second optical fiber and a second pump; and decreasing the power output from the second pump as a function of a minimum value for the second pump to minimize noise.

27. A method of controlling gain in a fiber amplifier with a controller, said method comprising the steps of:

receiving optical signals;

measuring gain of a fiber amplifier;

determining if the measured gain has changed;

increasing power to a first pump if the gain has decreased;

retrieving a minimum value from memory for the first pump;

measuring a value of the first pump indicative of pump output;

comparing the measured pump value with the retrieved minimum value;

decreasing power to the first pump if the measured pump value is greater than the minimum value; and limiting the power to the first pump to a minimum power value if the measured pump value is less than the minimum value.

28. The method as defined in claim 27 further comprising the step of determining the minimum value for the first pump to support backward amplified spontaneous emission.

29. The method as defined in claim 27 further comprising the steps of:

controlling power output from a second gain pump; and decreasing the power output from the second pump as a function of a minimum value for the second pump to minimize noise.

* * * * *